United States Patent [19]
Langlois

[11] Patent Number: 6,041,846
[45] Date of Patent: Mar. 28, 2000

[54] SECTIONAL DOOR, ESPECIALLY FOR USE ON VEHICLES

[76] Inventor: Richard Langlois, 2477 Capilano Crescent, Oakville Ontario, Canada, L6H 6L4

[21] Appl. No.: 09/247,608

[22] Filed: Feb. 10, 1999

[30] Foreign Application Priority Data

Feb. 20, 1998 [CA] Canada ................................ 2230342

[51] Int. Cl.7 .................................................. E06B 3/48
[52] U.S. Cl. .......................... 160/201; 160/229.1; 16/267
[58] Field of Search .................. 160/201, 229.1, 160/235, 236, 232; 16/267, DIG. 1, DIG. 13

[56] References Cited

U.S. PATENT DOCUMENTS

| | | | |
|---|---|---|---|
| 2,809,848 | 10/1957 | Carswell | 160/229.1 X |
| 2,952,313 | 9/1960 | Stroup | 160/229.1 X |
| 3,347,305 | 10/1967 | Urbanick | 160/229.1 X |
| 3,359,594 | 12/1967 | Pastoor | 160/235 |
| 4,315,345 | 2/1982 | Schijf | 16/267 |
| 4,532,973 | 8/1985 | De Falco | 160/201 X |
| 4,567,931 | 2/1986 | Wentzel | 160/232 |
| 4,771,816 | 9/1988 | Clay, Jr. | 160/235 |
| 4,930,561 | 6/1990 | Clay | 160/229.1 |
| 4,979,553 | 12/1990 | Lowry, III et al. | 160/232 X |
| 4,991,639 | 2/1991 | Clay, Jr. et al. | 160/201 |
| 5,002,114 | 3/1991 | Hormann | 160/229.1 |
| 5,147,850 | 9/1992 | Urbanick | 160/201 X |
| 5,163,493 | 11/1992 | Kraeutler | 160/201 |
| 5,220,951 | 6/1993 | Dagenais | 160/229.1 X |
| 5,419,386 | 5/1995 | Magro et al. | 160/232 |
| 5,566,740 | 10/1996 | Mullet et al. | 160/229.1 |
| 5,842,508 | 12/1998 | Krupke et al. | 160/235 |
| 5,927,369 | 7/1999 | Pedersen | 160/229.1 |

*Primary Examiner*—Daniel P. Stodola
*Assistant Examiner*—Hugh B. Thompson
*Attorney, Agent, or Firm*—Friedrich Kueffner

[57] ABSTRACT

A roll-up sectional door for trucks, trailers, or garages, comprising a series of panels connected by hinges allowing pivoting between the panels, wherein both the hinges and panels are suitable for injection molding. Each hinge includes a male hinge member having an integral pintle connected to its hinge leaf by a web member having a series of slots, and a female hinge member having a series of spaced knuckles dimensioned to partially embrace the pintle and to slide within the slots as the pintle rotates within the knuckles. The hinge members can be assembled when unattached to the panels, but are prevented from separation after attachment. One panel edge also has a cylindrically curved knuckle which embraces a side of the pintle opposite the spaced hinge knuckles when the parts are assembled, so that the pintle is positively held between the knuckles.

7 Claims, 5 Drawing Sheets

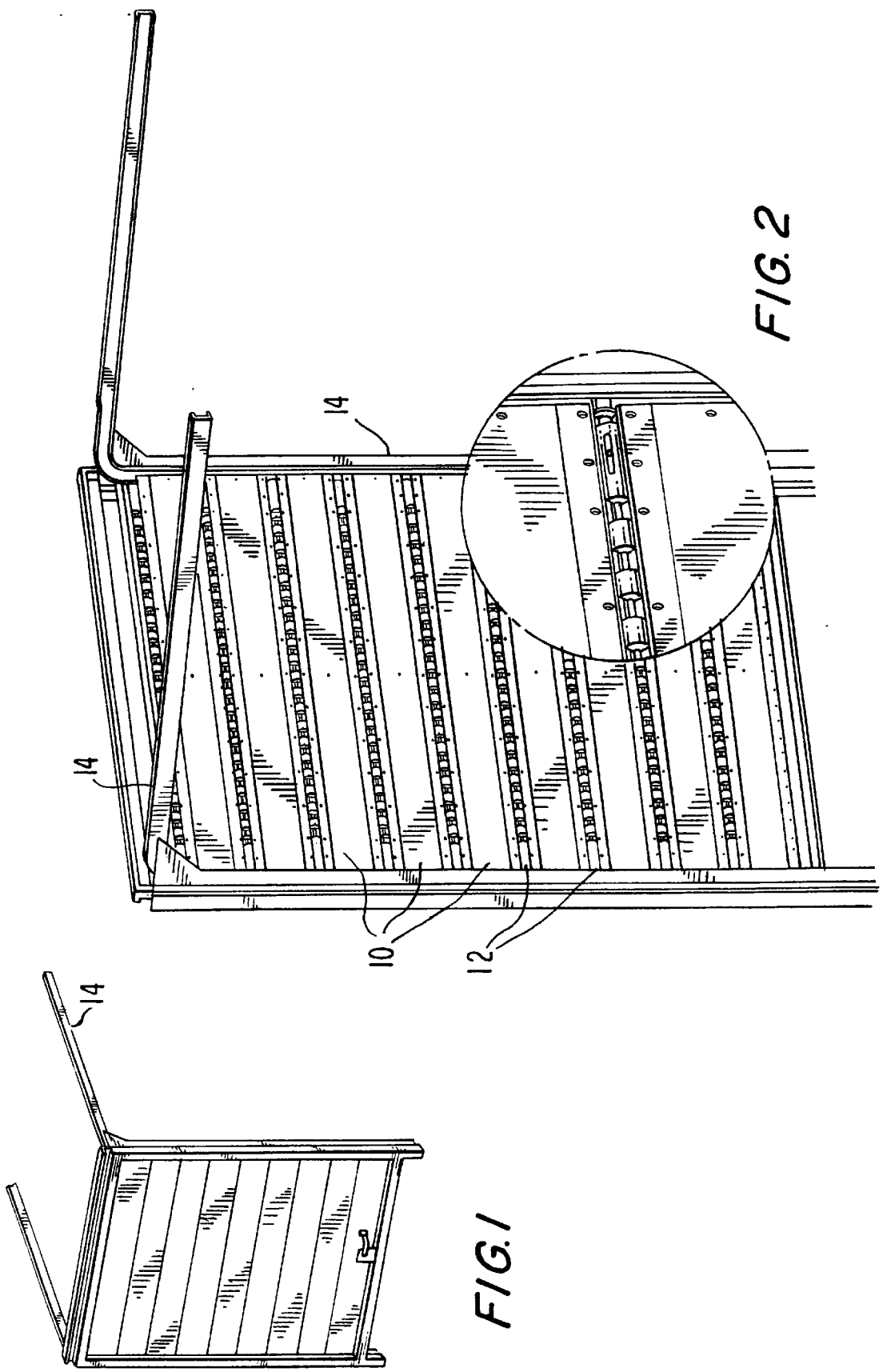

SECTIONAL DOOR, ESPECIALLY FOR USE ON VEHICLES

BACKGROUND OF THE INVENTION

1. Field of the Invention

The present invention relates to a sectional door of the type commonly used as an overhead or roll-up door on vehicles such as trucks or trailers, at loading docks, or as garage doors.

2. Prior Art

It is common to use sectional roll-up type doors at the rear end openings of trucks or trailers, at vehicle docking entrances, and as garage doors. Such doors have a series of similar horizontally extending panels or slats joined together by hinge means, the ends of the panels or hinge means having rollers which run in generally C-shaped tracks with a vertical leg at the sides of the opening and a horizontal leg above the rear of the opening. Examples of such doors are shown in the following patents:

U.S. Pat. No. 4,532,973, issued Aug. 6, 1985 to DeFalco;
U.S. Pat. No. 4,567,931, issued Feb. 4, 1986 to Wentzel;
U.S. Pat. No. 4,771,816, issued Sep. 20, 1988 to Clay, Jr.;
U.S. Pat. No. 4,930,561, issued Jun. 5, 1990 to Clay;
U.S. Pat. No. 4,991,639, issued Feb. 12, 1991 to Clay, Jr.;
U.S. Pat. No. 5,419,386, issued May 30, 1995 to Magro et al. and
Can.Pat.Appln.No.2,147,199, published Oct. 19, 1996.

Hitherto, such doors, as used for trucks, have been made of various materials including plywood, often provided with aluminum or steel skins, stamped steel, and extruded thermoplastic and aluminum. In the trucking business, such doors are often damaged, for example by fork trucks, and there is frequent need to replace panels and hinges. It thus becomes important that panels, and the connecting hinges, be easily replaced. But in general laminated panels when punctuated allow moisture to enter the interior being quickly absorbed by the wood core. With the thaw/freeze cycles there is expedited de-lamination, not to mention the increased weight concerns.

Some hinge arrangements, such as that shown in the aforesaid Canadian application, have a long hinge pin or pintle which needs to be extracted sideways when replacing panels; this is often difficult due to lack of space.

The same problem would seem to occur with the design used in the Wentzel patent, where a male hinge member must be threaded into a female member to assemble the hinges and panels.

Other designs, such as that of DeFalco, have a hinge arrangement which can be taken apart only when adjacent panels are at about 90° to each other. Depending on the track design, the panels will normally only be able to hinge through about 70° or 50° relative to each other, but the hinges can be disassembled by removing the end rollers from one hinge, and pivoting the adjacent panels to the 90° orientation. However, this can only be done at the corners of the track, which is not always convenient.

A further perceived drawback of some known designs, such as that of Wentzel, is that the male hinge member or pintle is only partially surrounded by the female member, and could seemingly pull out at least if these members were made of resilient material such as plastic.

Currently, most roll-up doors in the industry have bolted hinges, which fasten the individual panels. These bolts tend to rust or oxidize, coupled with drill holes that in time tend to enlarge allowing water to leak into the panel. This creates a most unattractive exterior door appearance. The exterior bolts are not flush to the panel surface making it difficult to attach corporate logos or advertisements. On the interior surface the hinges are also not flush to the panel surface which tends to catch freight.

SUMMARY OF THE INVENTION

The present invention provides a construction of panels and hinges for a sectional door which allows the hinge sections to be easily replaced in situ, without requiring the sideways withdrawal of any pintle or the like, and without requiring the panels to be angled relative to each other. Furthermore, all the main components of the door including the panels and the hinges can be formed of plastic material having some resiliency, while maintaining a strong hinge connection between the panels. But the present door is generally lighter than those in use now.

In accordance with the present invention, in a sectional door of the type comprising a series of panels having adjacent edges, including a first panel edge of one panel and a second panel edge of an adjacent, identical panel, connected by hinge means to allow relative pivoting between the panels, each hinge means comprises:

a male hinge member having a hinge leaf mountable to the first panel edge and having an integral pintle connected to its hinge leaf by a web member having a series of slots; and a female hinge member having a hinge leaf mountable to the second panel edge and having a series of spaced knuckles of cylindrically curved shape and dimensioned to partially embrace the integral pintle and to move slidably within the slots as the pintle rotates within said knuckles;

the arrangement of pintle and knuckles being such as to allow the hinge members to be assembled together when the hinge members are unattached to the panel edges and are pivoted within a first range of orientations relative to each other, and being such as to prevent separation of the hinge members when these members are within a second range of orientations relative to each other. This second range of movement preferably includes the coplanar condition of the panels.

The second panel edge has cylindrically curved knuckle means which embrace a side of the pintle opposite that embraced by the spaced knuckles of the female hinge member when this is attached to the second panel edge, so that the pintle is securely held relative to the female hinge member and the second panel edge.

In addition, the first panel edge may have a recess which slidably receives the curved knuckle means of the second panel edge when both hinge members are attached to panel edges, and such that the side of the pintle opposite the spaced knuckles is substantially enclosed at all times by the combination of the first and second panel edges. The fact that the pintle is enclosed by the combination of the female hinge member and the panel second edge means that the pintle is securely held and will not pull out even when all the parts are molded of plastic material, as is preferred. This also prevents dirt from entering the central part of the hinge from one side of the door, usually the outer side.

Preferably, the hinge leaves are mountable by screws onto the panel edges. This provides for easy replacement of hinges as compared to some prior art designs which use rivets, and in which it is necessary to remove rivets and replace with screws.

BRIEF DESCRIPTION OF THE DRAWINGS

A preferred embodiment of the invention will now be described by way of example with reference to the accompanying drawings, in which;

FIG. 1 is a view of the outer side of a truck or trailer door in accordance with the invention;

FIG. 2 is an enlarged view of the inner side of the same door, with a portion of a hinge between sections enlarged;

DETAILED DESCRIPTION

Referring to FIGS. 1 and 2, the truck or trailer door is made up of nine horizontally elongated panels 10 having their edges joined by eight hinges 12. Each hinge carries at its outer ends a roller, described below, which runs in one of two generally C-shaped tracks 14; of course, other suitably shaped tracks may be used. The tracks have vertical legs at the sides of the truck opening, the vertical legs being each connected by a curved portion to an upper horizontal leg. Each track is made of extruded plastic such as polyethylene or polypropylene; but the tracks may be metal tracks. The door operates in known manner, sliding from the closed position shown to an open, overhead position. Preferably, the bottom panel would have an additional roller or skate at its bottom.

Figure 3:
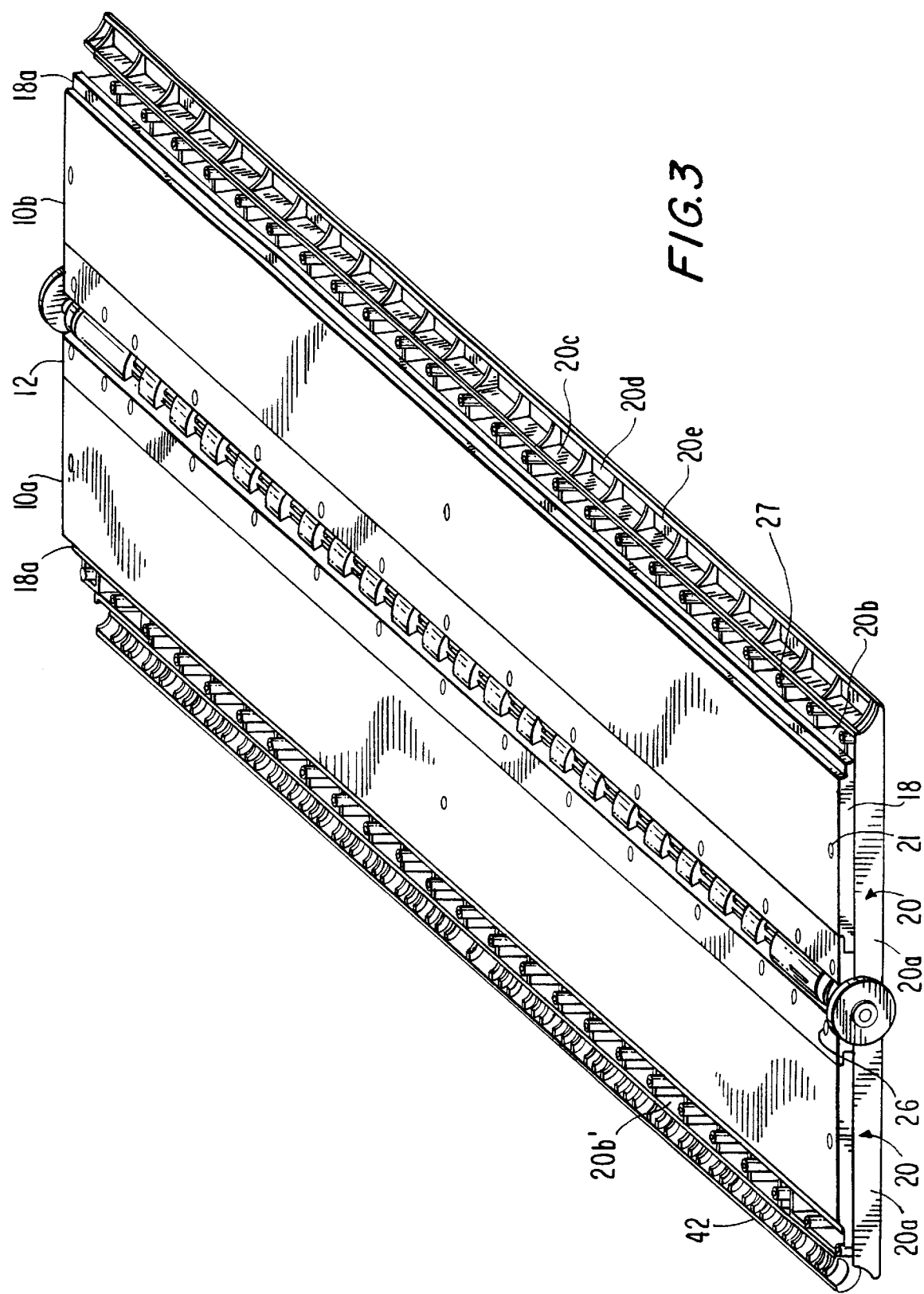
FIG. 3 is a view of two of the door panels with a connecting hinge.
Figure 4:
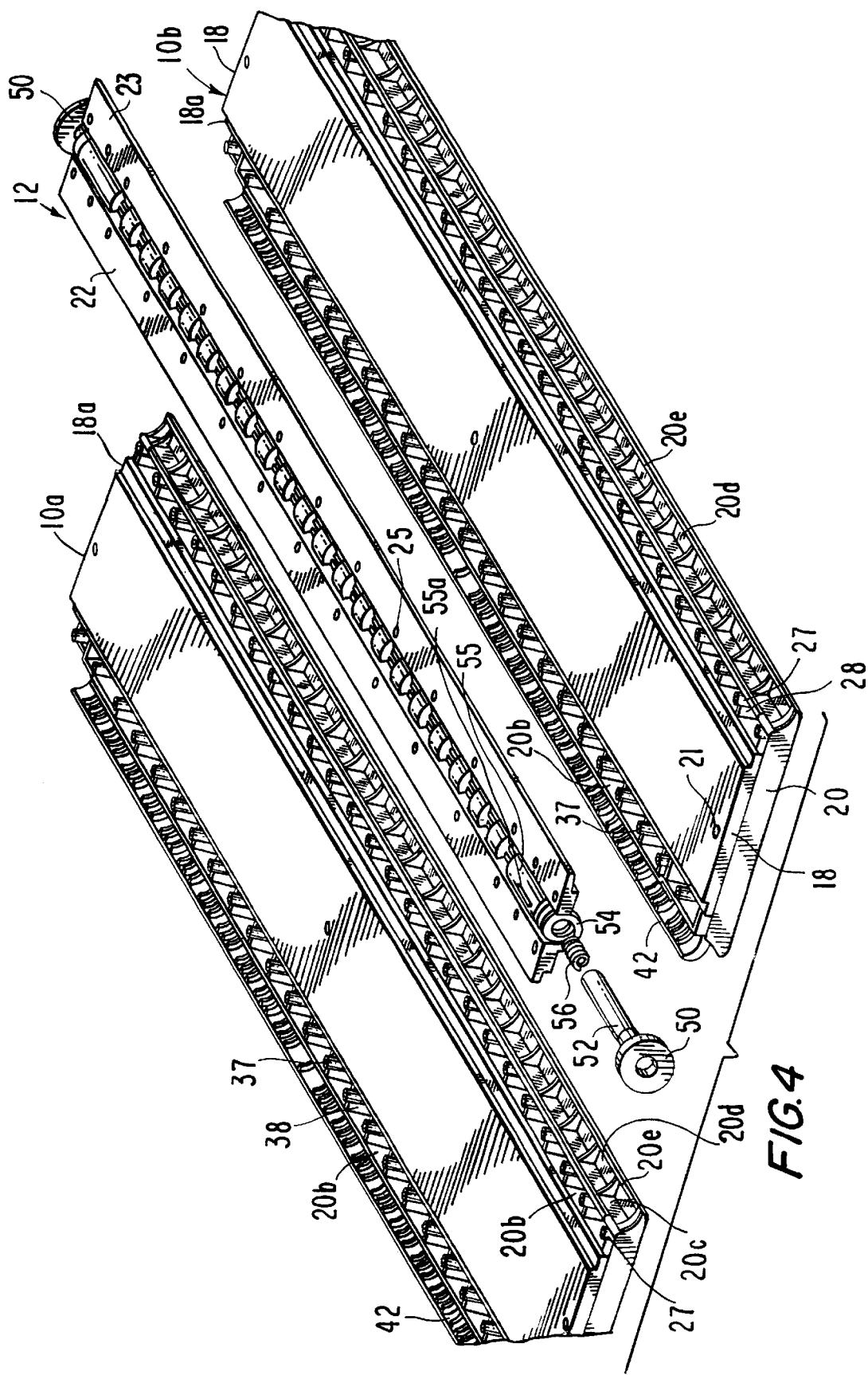
FIG. 4 is a view of the same parts shown in FIG. 3, but disassembled.

FIGS. 3 and 4 show two adjacent panels 10a and 10b and one connecting hinge 12 in more detail. Each panel is formed of two generally planar panel portions, namely a relatively thin inner panel portion 18 and a relatively thick outer panel portion 20, both of which are formed of plastic material by injection molding, and which are joined by screws 21. Both inner and outer panels are preferably slightly curved to increase stiffness. The inner panel portion is flat, apart from edge recesses 18a which receive the leafs of the hinge 12. The outer panel portion is in the form of a hollow tray with a flat outer surface and raised end flanges 20a, and raised side flanges 20b and 20b' beyond which are complex edge formations to be described.

Figure 5:
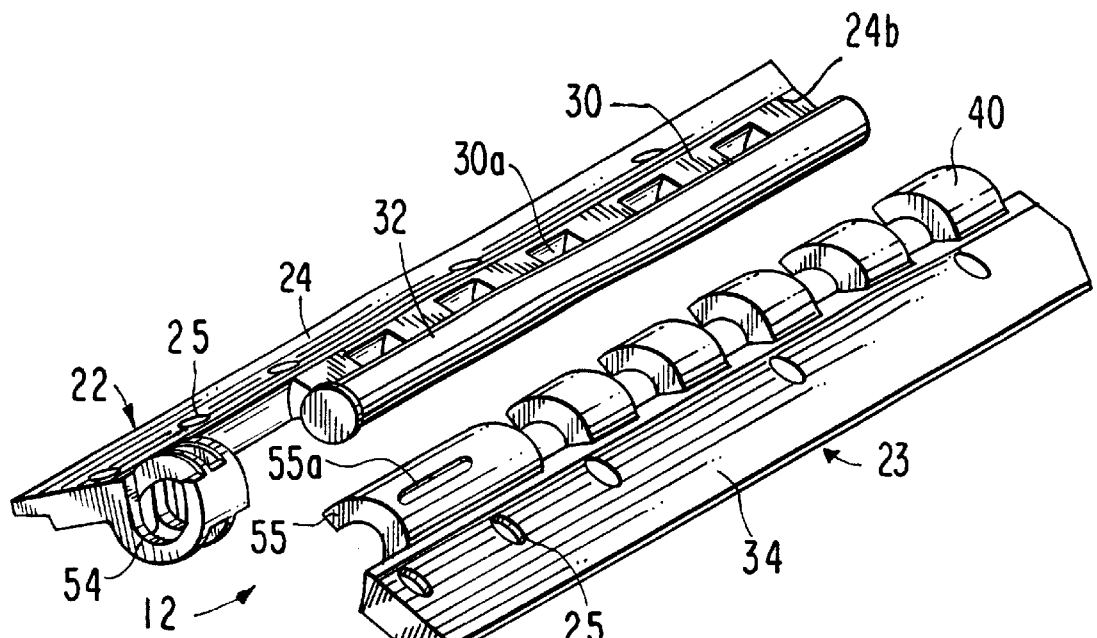
FIG. 5 is an enlarged view of end portions of two hinge members, before assembly.
Figure 6:
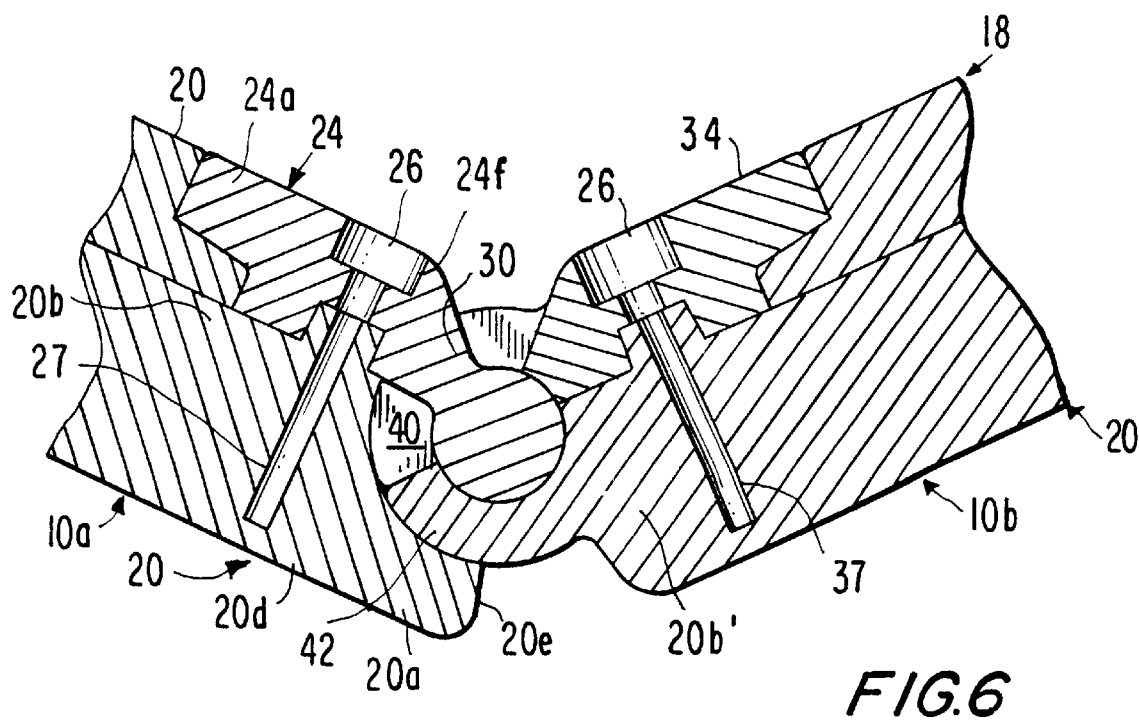
FIG. 6 is a cross-sectional view of a hinge and the adjacent edges of two panels.

Each hinge 12 is assembled from two injection molded, plastic members, namely a male member 22 and a female member 23, the forms of which are best seen in FIGS. 5 and 6. As shown, male member 22 has a leaf 24 with holes 25 for screws 26 by which it is normally attached to a first edge of panel 10a. The leaf 24 has an outer portion 24a which fits within the panel recess 18a, and has an inner portion 24b with screw holes 25 by which it may be secured to the outer panel portion 20. To receive the screws the panel portion 20 has a series of posts 27 spaced outside the side flanges 20b and connected thereto by webs 28. The inner leaf portion 24b is integrally connected by a web member 30 to a cylindrical pintle 32 which runs the main length of the hinge. Web member 30 has a series of evenly spaced slots 30a spaced along the hinge and occupying, in total combined length, about one half the length of the hinge. The inner surfaces of these slots provide continuations of the cylindrical surface of the pintle.

The female hinge member 23 has a leaf 34 similar to leaf 24 and mounted by screws 26 (screws are preferred, but press-fit connections are an alternative) a second edge of the panel 10b, the screws entering pillars 37 spaced slightly within the side flange 20b' of the second edge of the outer panel portion 20, being connected thereto by a web 38. The outer part of the leaf 34 fits into recess 18a in the inner panel portion 18. The leaf 34 carries spaced knuckles 40 which are cylindrically curved members having an internal radius which accommodates the pintle 32, and an outer radius dimensioned to fit within the slots 30a as the leaf 23 pivots relative to the leaf 24. The outer ends of knuckles 40 are coplanar with the bottom of leaf 34 which is also the parting plane of the panel portions 18 and 20. The parts are such that the hinge members can be assembled by pivoting through a first range of orientations, close to that shown in FIG. 5, in which the hinge leaf outer surfaces are at an angle of more than 180° to each other, and are locked together when the leafs are pivoted within a second range of orientations, which includes the coplanar condition they occupy when the door is closed.

The hinge parts are assembled together before the hinge leafs are screwed onto the panels. The second edge of panel 10b will be seen, particularly by reference to FIGS. 3 and 6, to have a continuous knuckle 42 connected to the side flange 20b' of the outer panel portion and which extends the majority of the hinge length, and which ends in the parting plane of the panel portions. This knuckle 42 has a series of internal ribs 42a which embrace the outer side of the pintle 32, so that when the hinge leaf 34 of the connected hinge members is screwed onto the second panel edge as shown, the pintle 32 is held between the knuckles 40 and 42, giving a positive retention of the pintle which prevents dislocation of the hinge even if there is some resilience in the parts.

In addition, the first panel edge of panel 10a has a recess which at least partially encloses the knuckle 42. This recess is provided by a continuous flange part 20c which runs along the outer sides of pillars 27, an extension 20d of the base of the panel portion 20, and an inturned lip 20e at the outer edge of the extension 20d which slidably contacts the outside of knuckle 42 so that the outer side of the pintle is substantially enclosed at all times. The outer end of the lip 20e fits closely against the flange 20'b when the panels are coplanar, further limiting the ingress of dirt into the hinge from the outer side of the door when closed. The hinge arrangement allows pivoting of the adjacent panels from the coplanar condition, through about 90°.

It will be seen that the hinge parts so far described are all suitable for injection molding, and that the substantial enclosure of the pintle means the hinge is not easily dislocated even if made of somewhat resilient material. The preferred material for molding the panels and hinges is a copolymer polypropylene which is foamed with nitrogen gas; the process is known as "structural foam molding".

Figure 7:
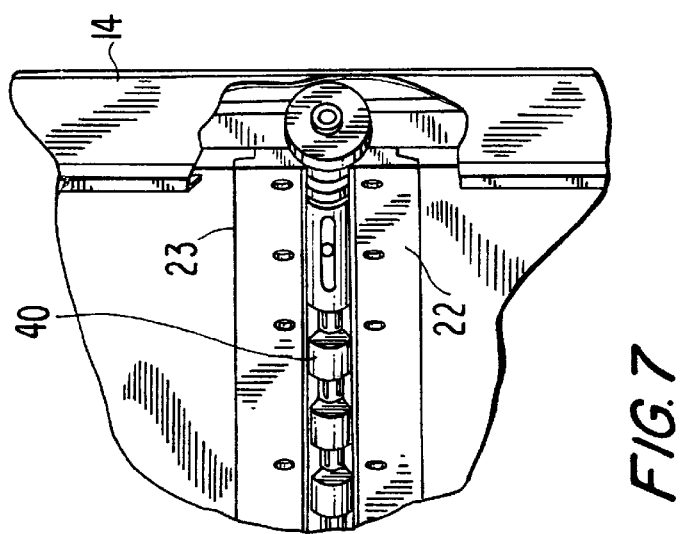
FIG. 7 is a perspective view of the end portion of a hinge, showing a roller and part of a track.

The ends of the hinge members have holding means for rollers 50 which run in the tracks 14. Referring to FIG. 4, the rollers 50 are each carried by a pin 52, the outer end portion of which is received in a bearing 54 which is integral with an end of the male hinge member 22. As shown in FIG. 5, this bearing is spaced from the end of the pintle 34, and the intervening space is enclosed on the inner side of the door by an extended knuckle 55 integral with the female hinge member 23, and is enclosed on the outer side by an end portion of the panel edge knuckle 42. Between the end of pin and the adjacent end of the pintle is a compression spring 56, seen in FIG. 4, also accommodated within the knuckles 42 and 55. In the assembled condition shown in FIG. 7, the spring 56 holds the shaft 52 in the center of the roller 50 which is rotatable and slidable on the shaft. The fact that the roller is coaxial with the hinge pintle gives a smooth operation to the door.

Figure 8:
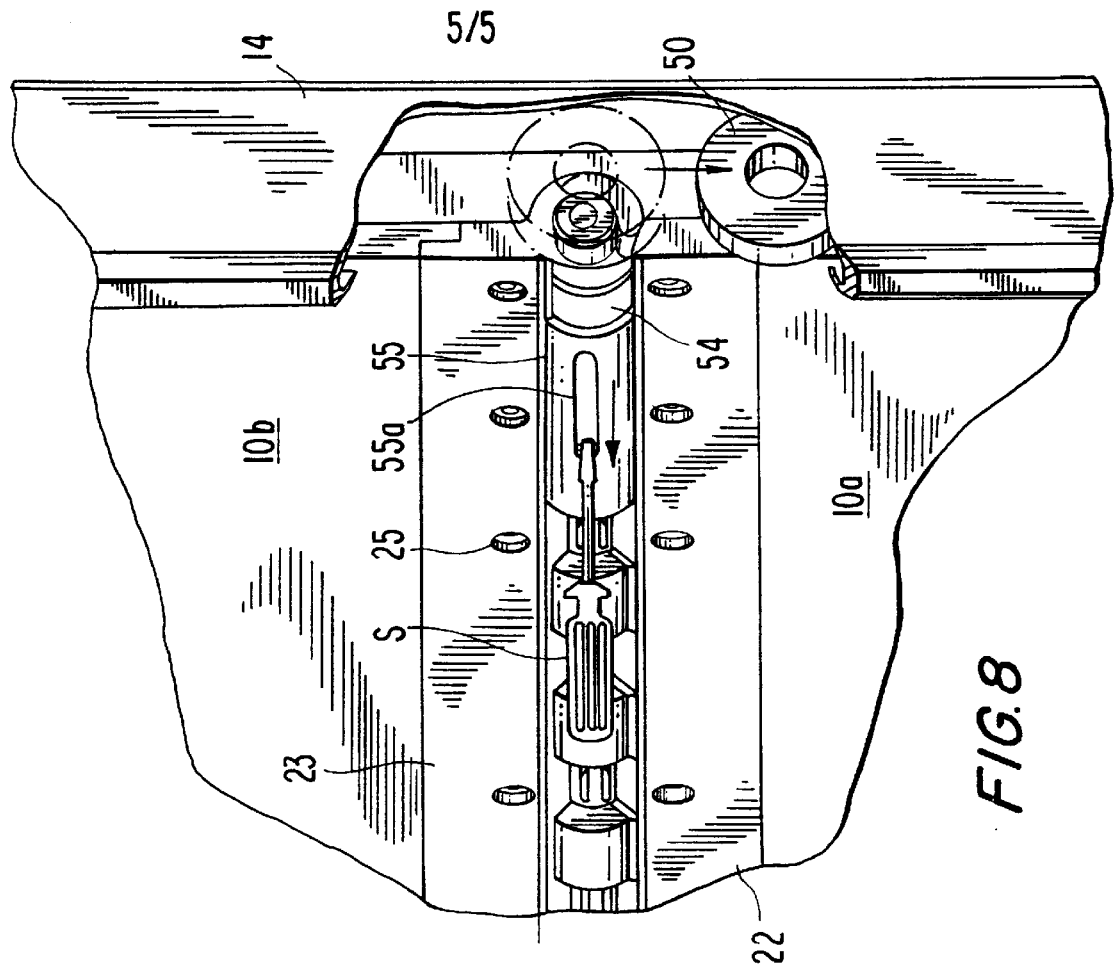
FIG. 8 is a similar view to FIG. 7, showing disassembly of a roller.

FIG. 8 shows how the roller can be removed, for example when it is damaged and needs replacement. For this purpose a tool such as a screw driver S is inserted into a longitudinal slot 55a in the knuckle 55, to compress the spring 52 and allow movement of the shaft to release the roller which can be moved to one side as shown in FIG. 8.

With this construction, replacement of damaged hinges or panels is easily done without special equipment, simply by removing the rollers at the end of a hinge, and removal of the screws 26. This can be done while the panels remain coplanar and in a convenient position.

A further advantage of this invention is that the interior knuckles 40 prevent truck cargo from being caught in the hinges, which can be a problem with prior designs.

I claim:

1. A sectional door comprising: a series of panels having adjacent edges, including a first panel edge of one panel and a second panel edge of an adjacent, identical panel, connected by at least one hinge which allows relative pivoting between the panels, wherein the at least one hinge means comprises, a male hinge member having a hinge leaf mountable to a first panel edge and having an integral pintle connected to its hinge leaf by a web member having a series of slots; and a female hinge member having a hinge leaf mountable to a second panel edge and having a series of spaced knuckles of cylindrically curved shape and dimensioned to partially embrace said integral pintle and to move slidably within said slots as the pintle rotates within said knuckles;

said arrangement of pintle and knuckles being such as to allow the hinge members to be assembled together when the hinge members are unattached to said edges and are pivoted within a first range of orientations relative to each other, and being such as to prevent separation of members when the hinge members are within a second range of orientations relative to each other;

and wherein said second panel edge also has a cylindrically curved knuckle which embraces a side of said pintle opposite that embraced by the said spaced knuckles when said second panel edge is attached to said female hinge member, so that the pintle is held between said spaced knuckles of said female hinge member and said curved knuckle of said second panel edge.

2. A sectional door according to claim 1, wherein said second range of orientations includes the condition in which the panels are coplanar.

3. A sectional door according to claim 1, wherein said first panel edge has a recess which slidably receives said curved knuckle of said second panel edge when both hinge members are attached to said panel edges, and such that the side of said pintle opposite the spaced knuckles is substantially enclosed at all times by the combination of said first and second edges.

4. A sectional door according to claim 1, wherein said hinge leafs are connected to the panel edges by screws.

5. A sectional door according to claim 4, wherein said panels are molded of plastic.

6. A sectional door according to claim 1, wherein said hinge members are molded of plastic.

7. A sectional door according to claim 1, wherein one of said hinge members includes, near to an end thereof, a sleeve for a roller shaft carrying a roller movable in a track at the side of the door, said roller being coaxial with the pintle of the at least one hinge.

* * * * *